United States Patent [19]

Le-Khac

[11] Patent Number: 4,764,558
[45] Date of Patent: Aug. 16, 1988

[54] ALKYL VINYL ETHER/N-ARYLMALEIMIDE COPOLYMER CONTAINING POLYMER ALLOY

[75] Inventor: Bi Le-Khac, West Chester, Pa.

[73] Assignee: Arco Chemical Company, Newtown Square, Pa.

[21] Appl. No.: 28,363

[22] Filed: Mar. 20, 1987

[51] Int. Cl.$^4$ ............... C08L 25/12; C08L 35/08; C08L 51/04; C08L 55/02
[52] U.S. Cl. ............................ 525/73; 525/75; 525/79; 525/86; 525/203; 525/205; 525/211
[58] Field of Search ............ 525/73, 203, 75, 79, 525/86, 205, 261

[56] References Cited

U.S. PATENT DOCUMENTS

| | | | |
|---|---|---|---|
| 4,151,224 | 4/1979 | Hendy et al. | 525/73 |
| 4,451,617 | 5/1984 | Khac | 525/203 |
| 4,510,287 | 4/1985 | Wu | 525/73 |
| 4,567,233 | 1/1986 | Tomono et al. | 525/73 |

*Primary Examiner*—Allan M. Lieberman
*Attorney, Agent, or Firm*—Dennis M. Kozak

[57] ABSTRACT

A thermodynamically miscible polymer composition containing a copolymer having recurring units of an alkyl vinyl ether and recurring units of an N-aryl substituted maleimide and an acrylonitrile copolymer is disclosed.

16 Claims, No Drawings

ALKYL VINYL ETHER/N-ARYLMALEIMIDE COPOLYMER CONTAINING POLYMER ALLOY

This invention relates to polymer compositions.

In one of its more specific aspects this invention pertains to thermodynamically miscible polymer compositions containing a copolymer of an alkyl vinyl ether with an N-aryl substituted maleimide monomer and an acrylonitrile copolymer.

The miscibility of polymers is generally determined using differential scanning calorimetry to measure glass transition temperature. A thermodynamically miscible polymer composition will exhibit a single glass transition temperature value which typically lies intermediate between the glass transition temperatures of the individual polymeric components. Correspondingly, a partially miscible or immiscible composition will exhibit two or more glass transition temperature values. Accordingly, two or more polymers are thermodynamically miscible when a mixture of the polymers results in a material exhibiting a single, well defined glass transition temperature.

Quite surprisingly, it has been found that within certain proportions a copolymer of an alkyl vinyl ether with an N-aryl substituted maleimide is thermodynamically miscible with a styrenic/acrylonitrile copolymer.

According to this invention there is provided a polymer composition comprising (A) a copolymer having from about 40 to about 60 mole % of an alkyl vinyl ether and from about 60 to about 40 mole % of an N-aryl substituted maleimide and (B) a polymer selected from the group consisting of (1) a copolymer matrix of from about 65 to about 85% by weight of a vinyl aromatic monomer selected from the group consisting of styrene and α-methylstyrene and from about 15 to about 35% by weight acrylonitrile, and (2) a rubber grafted with a copolymer matrix of from about 65 to about 85% by weight of a vinyl aromatic monomer selected from the group consisting of styrene and α-methylstyrene and from about 15 to about 35% by weight acrylonitrile wherein the weight ratio of component (A) to the copolymer matrix of component (B) is from 99:1 to 1:99; and wherein component (A) and the copolymer matrix of (B) are thermodynamically miscible with one another such that the polymer composition exhibits a single glass transition temperature value.

According to this invention, there is also provided a method of producing a molded composition which comprises forming a composition comprising (A) a copolymer having from about 40 to about 60 mole % of an alkyl vinyl ether and from about 60 to about 40% by weight of an N-aryl substituted maleimide and (B) a polymer selected from the group consisting of (1) a copolymer matrix of from about 65 to about 85% by weight of a vinyl aromatic monomer selected from the group consisting of styrene and α-methylstyrene and from about 15 to about 35% by weight acrylonitrile, and (2) a rubber grafted with a copolymer matrix of from about 65 to about 85% by weight of a vinyl aromatic monomer selected from the group consisting of styrene and α-methylstyrene, and from about 15 to about 35% by weight acrylonitrile and wherein the weight ratio of component (A) to the copolymer matrix of component (B) is from 99:1 to 1:99, and wherein component (A) and the copolymer matrix of (B) are thermodynamically miscible with one another such that the polymer composition exhibits a single glass transition temperature value, and molding the resulting composition.

Also, according to this invention there is provided a molded composition comprising a single continuous phase, the single continuous phase being a polymer composition comprising (A) a copolymer having from about 40 to about 60 mole % of an alkyl vinyl ether and from about 60 to about 40 mole % of an N-aryl substituted maleimide and (B) a copolymer matrix of from about 65 to about 85% by weight of a vinyl aromatic monomer selected from the group consisting of styrene and α-methylstyrene and from about 15 to about 35% by weight acrylonitrile.

According to this invention there is also provided a molded composition comprising a continuous phase and a disperse phase within the continuous phase, the continuous phase being a polymer composition comprising (A) a copolymer having from about 40 to about 60 mole % of an alkyl vinyl ether and from about 60 to about 40 mole % of an N-aryl substituted maleimide and (B) a copolymer matrix of from about 65 to about 85% by weight of a vinyl aromatic monomer selected from the group consisting of styrene and α-methylstyrene, and from about 15 to about 35% by weight acrylonitrile, the disperse phase being a rubber which is grafted with said copolymer matrix (B). When reference is made to the weight of the copolymer matrix of (B) it is to be understood that the weight of any rubber is to be excluded.

As the alkyl vinyl ether component of (A) use can be made of C1 to C18 alkyl vinyl ethers and mixtures thereof. Suitable alkyl vinyl ethers include methyl vinyl ether, ethyl vinyl ether, n-propyl vinyl ether, isopropyl vinyl ether, n-butyl vinyl ether, isobutyl vinyl ether, t-butyl vinyl ether, n-amyl vinyl ether, isoamyl vinyl ether, t-amyl vinyl ether, n-hexyl vinyl ether, n-heptyl vinyl ether, n-octyl vinyl ether, isoctyl vinyl ether, 2-ethylhexyl vinyl ether, decyl vinyl ether, dodecyl vinyl ether (laurel vinyl ether), tetradecyl vinyl ether, hexadecyl vinyl ether (ethyl vinyl ether), octadecyl vinyl ether, or mixtures thereof. Isobutyl vinyl ether is the preferred alkyl vinyl ether.

The N-aryl substituted maleimide of component (A) can be N-phenylmaleimide, N-tolylmaleimide, N-(chlorophenyl) maleimide, N-(bromophenyl) maleimide and the like, and their mixtures. The preferred N-aryl substituted maleimide is N-phenylmaleimide.

The preferred component (A) copolymer composition is from about 40 to about 60 mole % alkyl vinyl ether and from about 60 to about 40% by weight N-aryl substituted maleimide.

The peak molecular weight of the component (A) copolymer as measured by gel permeation chromatography (vs a monodisperse polystyrene standard) should be within the range of from 50,000 to about 500,000. The most preferred peak molecular weight range is from about 70,000 to about 150,000.

Examples of suitable component (B) materials include ABS (acrylonitrile-poly(butadiene)-styrene terpolymer) AES (acrylonitrile-EPDM-styrene terpolymer), SAN (styrene-acrylonitrile copolymer) and the like and their mixtures. The preparation of the rubber grafted (ABS or AES) polymers is well known and is incorporated in this invention by reference to U.S. Pat. Nos. 3,509,237; 3,509,238; 3,851,014; 3,903,200; 4,471,092 and 4,476,283. The preferred composition of component (B) is a rubber, either polybutadiene or EPDM, grafted with a copolymer having from 72 to 80% by weight of a vinyl aromatic monomer and 20 to 28% by weight of acrylonitrile. The vinyl aromatic monomer in component (B) can be either styrene or α-methylstyrene, however, most preferred is styrene.

The polymer composition of this invention will comprise from about 99 to about 1% by weight of component (A) and from about 1 to about 99% by weight of the copolymer matrix of component (B) excluding the weight of the rubber, if present. Preferably the polymer composition will comprise from 1 to 25 weight % of component (A) and from 99 to 75 weight % of the polymer matrix of component (B). If the rubber grafted with a copolymer matrix is selected as component (B), the amount of rubber utilized will be from about 1 to about 40 parts by weight per 100 parts of the copolymer matrix of (B), that is, the vinyl aromatic plus the acrylonitrile.

The polymer composition can be prepared using any suitable method of blending such as, for example, melt mixing or reaction blending. Reaction blending involves, for example, dissolving an already formed alkyl vinyl ether/N-aryl substituted maleimide copolymer in a mixture of styrene monomer and acrylonitrile monomer followed by incorporation of a free radical initiator and copolymerization of the styrene and acrylonitrile monomers.

Evaluation of material properties was performed based on the following ASTM standard tests: flexural modulus (D-790), tensile strength (D-638), elongation (D-638), notched Izod (D-256) and DTUL (deflection temperature under load), ⅛″ at 264 psi, (D-648). Glass transition temperature was determined by differential scanning calorimetry (DSC).

EXAMPLE 1

This example demonstrates the preparation of an isobutyl vinyl ether/N-aryl substituted maleimide suitable for use in the practice of this invention.

A solution of about 126.7 grams of N-phenylmaleimide in 600 milliliters of isopropyl acetate was prepared in a mixing vessel.

Next, the solution was transferred into a one liter stirred reactor at room temperature under a nitrogen atmosphere.

Into the reactor were charged about 83.3 grams of isobutyl vinyl ether and 0.4 gram of azoisobutyronitrile (Vazo 64 initiator, E. I. DuPont) to begin the polymerization. The polymerization reaction was carried out at 60° C. for about 4 hours. The resultant copolymer was isolated by precipitation in methanol and dried in a vacuum oven at 100° C. for about 4 hours. About 165 grams of isobutyl vinyl ether/N-phenylmaleimide copolymer was recovered.

The copolymer was tested and found to contain 72.9 weight % N-phenylmaleimide (% nitrogen determination) with the balance being isobutyl vinyl ether. The copolymer was also found to possess a glass transition temmperature (DSC) of 193° C. and a peak molecular weight of about 132,000 as measured by gel permeation chromatography (vs a monodisperse polystyrene standard).

The copolymer was also subjected to thermal gravametric analysis in both oxygen and nitrogen atmospheres. The results of the static thermal tests are set forth in following Table I.

TABLE I

| Atmosphere | Copolymer Weight Loss % | | |
|---|---|---|---|
| | 1% | 5% | 50% |
| Oxygen | 300° C. | 350° C. | 390° C. |
| Nitrogen | 300° C. | 335° C. | 400° C. |

EXAMPLE 2

This example demonstrates the thermodynamic miscibility of a polymer composition of this invention.

Equal amounts of the isobutyl vinyl ether/N-phenylmaleimide copolymer prepared in Example 1 and a styrene/acrylonitrile copolymer designated Lustran ® SAN-33 (32.2 wt % acrylonitrile) by Monsanto Chemical Company, were combined by dissolving both copolymers in tetrahydrofuran followed by precipitation in methanol. The resulting polymer composition was dried in a vacuum oven at 90° C. until a constant weight was reached.

Following Table 2 compares the individual glass transition temperatures of each above copolymer with the glass transition temperature of their composition. For the composition according to the invention (Polymer Composition), the data show a single well defined glass transition temperature intermediate between the glass transition temperatures of the copolymer components (A) and (B).

TABLE 2

| | Tg (°C.) |
|---|---|
| Isobutyl vinyl ether/N—phenylmaleimide copolymer (A) | 193 |
| Lustran ®-SAN-33 (styrene/acrylonitrile copolymer) (B) | 109 |
| Polymer Composition (C)(50 wt % A/50 wt % B) | 128 |

EXAMPLE 3

This example demonstrates the preparation of three polymer compositions of this invention using the isobutyl vinyl ether/N-phenylmaleimide prepared according to Example 1 and a styrene/acrylonitrile copolymer designated Lustron ® SAN-31 (23.4 wt. % acrylonitrile) by Monsanto Chemical Company. Substantially the method of Example 2 was used with the exception that the copolymers were individually combined in amounts to give three polymer compositions containing 25, 50 and 75 weight percent isobutylene/N-phenylmaleimide, respectively. Following Table 3 shows the glass transition temperature values of each composition as compared to the glass transition temperatures of the individual copolymer components.

TABLE 3

| | Composition (wt %) | | | | |
|---|---|---|---|---|---|
| Isobutyl vinyl ether/N—phenylmaleimide copolymer | — | 25 | 50 | 75 | 100 |
| Lustran ® SAN-31 | 100 | 75 | 50 | 25 | — |
| Tg(DSC) | 109° C. | 120° C. | 142° C. | 165° C. | 193° C. |

EXAMPLE 4

This example demonstrates the thermodynamic miscibility of a polymer composition of this invention.

About 20 grams of the isobutyl vinyl ether/N-phenylmaleimide copolymer prepared in Example 1 and about 30 grams of ABS designated Cyrolac L-1000 by Borg- Warner Company, were combined by melt blending in a Brabender at about 460° F. for about 5 minutes.

Following Table 4 compares the individual glass transition temperatures of each above copolymer with the glass transition temperature of their composition. For the composition according to the invention (Polymer Composition), the data show a single well defined glass transition temperature intermediate between the glass transition temperatures of the copolymer components (A) and (B).

TABLE 4

|  | Tg (°C.) |
|---|---|
| Isobutyl vinyl ether/N—phenylmaleimide copolymer (A) | 193 |
| CYCROLAC L-1000 Borg-Warner (B) | 106 |
| Polymer Composition (40 wt % A/60 wt % B) (C) | 132 |

EXAMPLE 5

The example demonstrates the useful physical properties, particularly heat distortion temperature, obtained from a polymer composition of this invention which contains 10 parts of an isobutyl vinyl ether/N-phenylmaleimide copolymer prepared following substantially the procedure of Example 1, and 100 parts of the Cycolac L-1000 ABS. The copolymers were combined using the procedure of Example 4, extruded into pellets and the pellets injection molded into test specimens. Table 5 shows the physical properties obtained as compared to the physical properties of the molded ABS resin alone.

TABLE 5

| ABS[1] | 100 | 100 |
|---|---|---|
| Isobutyl Vinyl Ether/N—PMI (Example 1) | 10 phr | — |
| Extrusion Temp. | 460° F. | 460° F. |
| Pyromelt | 460° F. | 460° F. |
| Tg(°C., DSC) | 118 | 106 |
| Tensile Str (psi) | 5,490 | 5,160 |
| Flex Str. (psi) | 246,000 | 235,000 |
| Tensile Mod (psi) | 188,000 | 172,100 |
| DTUL (⅛", °F.) | 183 | 167 |
| GFWI (in-lbs) | 240 | 320+ |
| Notched Izod (ft-lbs/in) | 6.0 | 9.1 |

It will be evident from the foregoing that various modifications can be made to this invention. Such, however, are considered as being within the scope of the invention.

What is claimed is:

1. A polymer composition comprising (A) a copolymer having from about 40 to about 60 mole % of at least one $C_1$ to $C_{18}$ alkyl vinyl ether and from about 60 to about 40 mole % of at least one N-aryl substituted maleimide, said component (A) having a peak molecular weight of from about 50,000 to about 500,000 and (B) a polymer selected from the group consisting of (1) a copolymer matrix of from about 65 to about 85% by weight of a vinyl aromatic monomer selected from the group consisting of styrene and α-methylstyrene and from about 15 to about 35% by weight acrylonitrile, and (2) a rubber grafted with a copolymer matrix of from about 65 to about 85% by weight of a vinyl aromatic monomer selected from the group consisting of styrene and α-methylstyrene, and from about 15 to about 35% by weight acrylonitrile wherein the weight ratio of component (A) to the copolymer matrix of component (B) is from 99:1 to 1:99; wherein if component (B) (2) is employed, the rubber will be present in an amount of from about 1 to about 40 parts per each 100 parts of the copolymer matrix; and wherein component (A) and the copolymer matrix of (B) are thermodynamically miscible with one another such that the polymer composition exhibits a single glass transition temperature value.

2. The polymer composition of claim 1 in which said N-aryl substituted maleimide of component (A) is selected from the group consisting of at least one of N-phenylmaleimide, N-tolymaleimide, N-(chlorophenyl) maleimide and N-(bromophenyl) maleimide.

3. The polymer composition of claim 1 in which said alkyl vinyl ether of component (A) is selected from the group consisting of at least one of methyl vinyl ether, ethyl vinyl ether, n-propyl vinyl ether, isopropyl vinyl ether, n-butyl vinyl ether, isobutyl vinyl ether, t-butyl vinyl ether, n-amyl viny ether, isoamyl vinyl ether, t-amyl vinyl ether, n-hexyl vinyl ether, n-heptyl vinyl ether, n-octyl vinyl ether, isoctyl vinyl ether, 2-ethylhexyl vinyl ether, decyl vinyl ether, dodecyl vinyl ether (laurel vinyl ether), tetradecyl vinyl ether, hexadecyl vinyl ether (ethyl vinyl ether), octadecyl vinyl ether, or mixtures of these.

4. The polymer composition of claim 1 in which component (A) is a copolymer of recurring units of isobutyl vinyl ether and N-phenylmaleimide.

5. The polymer composition of claim 1 in which the component (A) copolymer has a peak molecular weight within the range of from about 50,000 to about 500,000.

6. The polymer composition of claim 1 in which the component (A) copolymer has a peak molecular weight within the range of from about 70,000 to about 150,000.

7. The polymer composition of claim 1 in which said component (B) is an acrylonitrile-poly(butadiene)-styrene terpolymer.

8. The polymer composition of claim 1 in which said component (B) is an acrylonitrile-EPDM-styrene terpolymer.

9. The polymer composition of claim 8 in which said component (B) is a styrene-acrylonitrile copolymer.

10. The polymer composition of claim 1 in which said component (B) is an acrylonitrile-poly(butadiene)-methylstyrene terpolymer.

11. The polymer composition of claim 1 in which said component (B) is an acrylonitrile-EPDM-α-methylstyrene terpolymer.

12. The polymer composition of claim 1 in which said component (B) is a α-methylstyrene-acrylonitrile copolymer.

13. The polymer composition of claim 1 in which the weight ratio of component (A) to the copolymer matrix of component (B) is from 25:75 to 1:99.

14. A method of producing a molded composition which comprises forming a composition comprising (A) a copolymer having from about 40 to about 60 mole % of at least one $C_1$ to $C_{18}$ alkyl vinyl ether and from about 60 to about 40 mole % of at least one N-aryl substituted maleimide, said component (A) having a peak molecular weight of from about 50,000 to about 500,000 and (B) a polymer selected from the group consisting of (1) a copolymer matrix of from about 65 to about 85% by weight of a vinyl aromatic monomer selected from the group consisting of styrene and α-methylstyrene and from about 15 to about 35% by weight acrylonitrile and (2) a rubber grafted with a copolymer matrix of from about 65 to about 85% by weight of a vinyl aromatic monomer selected from the group consisting of styrene and α-methylstyrene, and from about 15 to about 35% by weight acrylonitrile, wherein the weight ratio of component (A) to the copolymer matrix of component (B) is from 99:1 to 1:99; wherein if component (B) (2) is employed the rubber will be present in an amount of from about 1 to about 40 parts per each 100 parts of the copolymer matrix; and wherein component (A) and the copolymer matrix of (B) are thermodynamically miscible with one another such that the polymer composition exhibits a single glass transition temperature value, and molding the resulting composition.

15. A molded composition comprising a single continuous phase, the single continuous phase being a polymer composition comprising (A) a copolymer having from about 40 to about 60 mole % of at least one $C_1$ to $C_{18}$ alkyl vinyl ether and from about 60 to about 40 mole % of at least one N-aryl substituted maleimide, said component (A) having a peak molecular weight of from 50,000 to about 500,000 and (B) a copolymer matrix of from about 65 to about 85% by weight of a vinyl aromatic monomer selected from the group consisting of styrene and α-methylstyrene and from about 15 to about 35% by weight acrylonitrile.

16. A molded composition comprising a continuous phase and a disperse phase within the continuous phase, the continuous phase being a polymer composition comprising (A) a copolymer having from about 40 to about 60 mole % by weight of at least one $C_1$ to $C_{18}$ alkyl vinyl ether and from about 60 to about 40 mole % of at least one N-aryl substituted maleimide, said component (A) having a peak molecular weight of from 50,000 to about 500,000, and (B) a copolymer matrix of from about 65 to about 85% by weight of a vinyl aromatic monomer selected from the group consisting of styrene and α-methylstyrene, and from about 15 to about 35% by weight acrylonitrile, the disperse phase being a rubber which is grafted with said copolymer matrix (B).

* * * * *